United States Patent
Hara

(10) Patent No.: US 6,201,092 B1
(45) Date of Patent: Mar. 13, 2001

(54) ADDITION CURING TYPE SILICONE COMPOSITIONS

(75) Inventor: Hiroyasu Hara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/244,652

(22) Filed: Feb. 4, 1999

(30) Foreign Application Priority Data

Feb. 4, 1998 (JP) .................................................. 10-38189

(51) Int. Cl.⁷ .......................... C08G 77/08; C08G 77/52; C08G 77/20
(52) U.S. Cl. ................. 528/15; 528/31; 528/32; 528/33
(58) Field of Search .................. 528/31, 32, 33, 528/15

(56) References Cited

U.S. PATENT DOCUMENTS

| | | |
|---|---|---|
| 3,699,072 | 10/1972 | Clark et al. . |
| 4,077,943 | 3/1978 | Sato et al. . |
| 5,019,419 * | 5/1991 | Matsumoto ............................ 427/96 |

FOREIGN PATENT DOCUMENTS

| | | |
|---|---|---|
| 2066833A | 7/1981 | (GB) . |
| 5313508 | 5/1978 | (JP) . |
| 5321026 | 6/1978 | (JP) . |
| 53-118453A * | 10/1978 | (JP) . |

OTHER PUBLICATIONS

Encyclopedia of Polymer Science and Engineering, John Wiley & Sons, 1989, 2nd Ed., vol. 15, pp. 246 and 260.*
Silicones, Freeman, Plastics Institute, 1962, pp. 28–29.*
CRC Handbook of Chemistry and Physics, 61st Ed., edited by Weast et al., CRC Press, Inc., 1981, p. F–49.*

* cited by examiner

Primary Examiner—Robert Dawson
Assistant Examiner—Kao Liang Peng

(57) ABSTRACT

In an addition curing type silicone composition comprising (A) an organopolysiloxane having at least two alkenyl groups each attached to a silicon atom in a molecule, (B) an organohydrogenpolysiloxane having at least two hydrogen atoms each attached to a silicon atom in a molecule, and (C) a platinum catalyst, a (meth)acryloxyalkyl-modified organopolysiloxane having a linear or cyclic organopolysiloxane structure and a viscosity of 5–10,000 centipoise at 25° C. is blended as an adhesion promoter for improving the adhesion of the composition to difficultly bondable substrates.

7 Claims, No Drawings

ADDITION CURING TYPE SILICONE COMPOSITIONS

This invention relates to addition curing type silicone compositions which in the cured state have improved heat resistance and form firm bonds to various substrates of resins and metals and which are applicable as the adhesive to electric and electronic parts and automotive parts.

BACKGROUND OF THE INVENTION

For providing addition curing type silicone adhesives which are bondable to a variety of substrates, attempts were made to add tackifiers (or adhesion agents) to curable silicone resins so that the resin might become more adhesive. For example, JP-B 21026/1978 corresponding to U.S. Pat. No. 3,699,072 discloses an addition curing type silicone rubber composition comprising an organohydrogensiloxane having alkoxysilyl groups, and JP-B 13508/1978 corresponding to U.S. Pat. No. 4,077,943 discloses an addition curing type silicone rubber composition comprising an organohydrogensiloxane having epoxy groups.

The prior art addition curing type silicone adhesives, however, are difficultly self-bondable to some substrates, especially resins. Primers must be applied before the silicone adhesives can be bonded. Such difficultly bondable resins are polycarbonates and polyphenylene sulfites. Nowadays, there is an increasing demand for addition curing type silicone adhesives capable of self-bonding to such resins.

As prior art approaches for producing addition curing type silicone adhesives capable of self-bonding to difficultly bondable resins, the addition of nitrogen compounds is known from JP-B 147963/1977. Also developed was a technique of using alkoxysilanes as a tackifier and adding organic tin compounds, organic titanium compounds or organic aluminum compounds as a hydrolytic catalyst.

These techniques, however, are not satisfactory since they can affect the curing of addition curing type silicone adhesives. More particularly, when nitrogen compounds are added to the addition curing type silicone adhesives, these compounds significantly inhibit the catalysis of platinum atom serving as the addition reaction catalyst, resulting in unstable curing. When organic tin compounds, organic titanium compounds or organic aluminum compounds are added, these compounds can deactivate organohydrogensiloxanes in the addition curing type silicone adhesives and act to cleave siloxane bonds in the silicone polymers at elevated temperatures, causing to reduce the heat resistance of the cured composition.

SUMMARY OF THE INVENTION

Therefore, an object of the present invention is to provide a novel and improved addition curing type silicone composition having improved curing stability, thermal stability and adhesion which cures into a product capable of firm adhesion to difficultly bondable resins.

We have found that when an addition curing type silicone composition comprising (A) an organopolysiloxane having at least two alkenyl groups each attached to a silicon atom in a molecule, (B) an organohydrogenpolysiloxane having at least two hydrogen atoms each attached to a silicon atom in a molecule, and (C) a platinum catalyst is further blended with (D) a (meth)acryloxyalkyl-modified organopolysiloxane having a linear or cyclic organopolysiloxane structure and a viscosity of 5 to 10,000 centipoise at 25° C. as an adhesion promoter, the (meth)acryloxyalkyl-modified organopolysiloxane quickly diffuses into the composition (that is, into the organopolysiloxane matrix) and (meth)acryl groups in its molecule have high affinity to various substrates. Then the (meth)acryloxyalkyl-modified organopolysiloxane is successful in providing the composition with improved adhesion without adversely affecting the curing and thermal stability of the composition. There is obtained an addition curing type silicone composition which in the cured state forms firm bonds to difficultly bondable resins such as polycarbonates and polyphenylene sulfites.

Accordingly, the present invention provides an addition curing type silicone composition comprising (A) 100 parts by weight of an organopolysiloxane having at least two alkenyl groups each attached to a silicon atom in a molecule, represented by the following average compositional formula (1):

$$R^1_a R^2_b SiO_{(4-a-b)/2} \quad (1)$$

wherein $R^1$ is a substituted or unsubstituted monovalent hydrocarbon group free of an aliphatic unsaturated bond, $R^2$ is an alkenyl group, letter a is a number of 1.4 to 2.0, b is a number of 0.0001 to 0.5, and the sum of a and b is from 1.9 to 2.05, (B) an organohydrogenpolysiloxane having at least two hydrogen atoms each attached to a silicon atom in a molecule, represented by the following average compositional formula (2):

$$R^3_c H_d SiO_{(4-c-d)/2} \quad (2)$$

wherein $R^3$ is a substituted or unsubstituted monovalent hydrocarbon group free of an aliphatic unsaturated bond, letter c is a number of 0.7 to 2.0, d is a number of 0.005 to 1.2, and the sum of c and d is from 0.8 to 3.0, in an amount to provide 0.4 to 10 silicon atom-attached hydrogen atoms per alkenyl group in the composition, (C) a catalytic amount of a platinum catalyst, (D) 0.0001 to 3 parts by weight of a (meth)acryloxyalkyl-modified organopolysiloxane having a linear or cyclic organopolysiloxane structure and a viscosity of 5 to 10,000 centipoise at 25° C.

DETAILED DESCRIPTION OF THE INVENTION

Component (A) of the addition curing type silicone composition according to the invention is the main component of the composition and an organopolysiloxane having at least two alkenyl groups each attached to a silicon atom in a molecule, represented by the following average compositional formula (1):

$$R^1_a R^2_b SiO_{(4-a-b)/2} \quad (1)$$

wherein $R^1$ is a substituted or unsubstituted monovalent hydrocarbon group free of an aliphatic unsaturated bond, $R^2$ is an alkenyl group, letter a is a number of 1.4 to 2.0, b is a number of 0.0001 to 0.5, and the sum of a and b is from 1.9 to 2.05. Preferably, a is a number of 1.9 to 2.0, b is a number of 0.001 to 0.1, and the sum of a and b is from 1.95 to 2.02.

With respect to molecular structure, the organopolysiloxane of formula (1) may be linear, partially branched or cyclic. It may be a homopolymer consisting of identical siloxane units or a copolymer consisting of two or more different siloxane units. Most often, it is a linear diorganopolysiloxane having a backbone portion consisting essentially of recurring diorganosiloxane units and blocked with a triorganosiloxy unit at each end. The alkenyl group in the molecule may be attached to either the silicon atom at the end of the molecular chain or a silicon atom midway the molecular chain or both. When the physical properties of the cured product is taken into account, the organopolysiloxane should preferably have alkenyl groups attached to the silicon atoms at the both ends of the molecular chain.

In formula (1), $R^1$ represents substituted or unsubstituted monovalent hydrocarbon groups free of an aliphatic unsaturated bond, preferably having 1 to 12 carbon atoms, especially 1 to 8 carbon atoms, for example, alkyl groups such as methyl, ethyl, propyl, isopropy, butyl, isobutyl, tert-butyl, hexyl, 2-ethylhexyl, octyl, decyl, and dodecyl; cycloalkyl groups such as cyclopentyl, cyclohexyl, and cycloheptyl; aryl groups such as phenyl, tolyl, xylyl, and naphthyl; aralkyl groups such as benzyl, phenylethyl, and phenylpropyl; and substituted ones of these hydrocarbon groups wherein all or some of the hydrogen atoms are replaced by halogen atoms such as fluorine atoms and chlorine atoms or nitrile groups, typically substituted alkyl groups such as trifluoropropyl, chloromethyl, and cyanoethyl. The $R^1$ groups may be the same or different. It is preferred from the standpoints of chemical stability and ease of synthesis that all $R^1$ groups are methyl although some of the methyl groups may be replaced by phenyl or trifluoropropyl groups if necessary for particular properties.

$R^2$ represents alkenyl groups preferably having 2 to 8 carbon atoms, especially 2 to 4 carbon atoms, for example, vinyl, allyl, propenyl, isopropenyl, butenyl, isobutenyl, hexenyl, and pentenyl groups. Among these, vinyl and allyl groups are preferred, and vinyl is most preferred from the standpoints of chemical stability and ease of synthesis.

The organopolysiloxane (A) preferably has a viscosity at 25° C. of at least 10 centistokes (cs), more preferably 50 to 1,000,000 cs, especially 100 to 500,000 cs. With a viscosity of less than 10 cs, a cured product would be brittle and fail to follow deformation of the underlying substrate. With a viscosity of more than 1,000,000 cs, an uncured composition would have a higher viscosity and be inconvenient to handle. Two or more organopolysiloxanes may be used in combination insofar as their viscosity is within the above-defined range.

Component (B) is an organohydrogenpolysiloxane having at least two, preferably at least three hydrogen atoms each attached to a silicon atom (that is, SiH groups) in a molecule, represented by the following average compositional formula (2):

$$R^3{}_c H_d SiO_{(4-c-d)/2} \qquad (2)$$

wherein $R^3$ is a substituted or unsubstituted monovalent hydrocarbon group free of an aliphatic unsaturated bond, letter c is a number of 0.7 to 2.0, d is a number of 0.005 to 1.2, and the sum of c and d is from 0.8 to 3.0. Preferably, c is a number of 0.9 to 2.0, d is a number of 0.1 to 1.0, and the sum of c and d is from 1.0 to 2.5.

The organohydrogenpolysiloxane serves as a crosslinking agent. In the presence of a platinum catalyst as component (C), hydrogen atoms attached to silicon atoms (that is, SiH groups) in the organohydrogenpolysiloxane as component (B) gives rise to addition reaction at room temperature or under heating with alkenyl groups attached to silicon atoms in the organopolysiloxane as component (A), producing a three-dimensional network structure.

In formula (2), the substituted or unsubstituted monovalent hydrocarbon groups free of an aliphatic unsaturated bond represented by $R^3$ are preferably those of 1 to 12 carbon atoms, more preferably 1 to 12 carbon atoms, as exemplified above for $R^1$. The $R^3$ groups may be the same or different. It is preferred from the standpoints of chemical stability and ease of synthesis that all $R^3$ groups are methyl although some of the methyl groups may be replaced by phenyl or trifluoropropyl groups if necessary to provide desired properties. The organohydrogenpolysiloxanes may be used alone or in admixture of two or more.

The molecular structure of the organohydrogenpolysiloxane is not critical and may be linear, branched, cyclic or three-dimensional network (or resinous). The organohydrogenpolysiloxane may be a homopolymer consisting of siloxane units having silicon-attached hydrogen atoms (i.e., SiH groups) or a copolymer of such units with at least one of triorganosilyl, diorganosiloxane, monoorganosiloxane and $SiO_2$ units. Illustrative examples of the organohydrogenpolysiloxane (B) include ethylhydrogensiloxane cyclic polymers,
ethylhydrogen-dimethylsiloxane cyclic copolymers,
both end trimethylsiloxy-blocked methylhydrogenpolysiloxane,
both end trimethylsiloxy-blocked dimethylsiloxanemethylhydrogensiloxane copolymers,
both end dimethylhydrogensiloxy-blocked dimethylpolysiloxane,
both end dimethylhydrogensiloxy-blocked dimethylsiloxanemethylhydrogensiloxane copolymers,
both end dimethylhydrogensiloxy-blocked dimethylsiloxanemethylhydrogensiloxane-diphenylsiloxane copolymers,
both end dimethylhydrogensiloxy-blocked dimethylsiloxanediphenylsiloxane copolymers,
both end dimethylhydrogensiloxy-blocked methylhydrogensiloxane-diphenylsiloxane copolymers,
both end trimethylsiloxy-blocked methylhydrogensiloxane-diphenylsiloxane copolymers,
both end trimethylsiloxy-blocked methylhydrogensiloxanediphenylsiloxane-dimethylsiloxane copolymers,
copolymers comprising $(CH_3)_2HSiO_{1/2}$ units and $SiO_{4/2}$ units,
copolymers comprising $(CH_3)_3SiO_{1/2}$ units, $(CH_3)_2HSiO_{1/2}$ units and $SiO_{4/2}$ units,
copolymers comprising $(CH_3)_2HSiO_{1/2}$ units, $SiO_{412}$ units, and $(C_6H_5)SiO_{3/2}$ units, and
copolymers comprising $(CH_3)HSiO_{2/2}$ units and $(CH_3)SiO_{3/2}$ units and/or $HSiO_{3/2}$ units.

The organohydrogenpolysiloxane may have any desired degree of polymerization. It is, however, preferred from the standpoints of compatibility with component (A) and ease of synthesis that the number of silicon atoms in a molecule or the degree of polymerization be about 3 to about 200, preferably about 4 to about 150.

The organohydrogenpolysiloxane (B) is blended in such amounts that there are available 0.4 to 10 hydrogen atoms, preferably 1.2 to 5 hydrogen atoms each attached to a silicon atom (i.e., SiH groups) in the organohydrogenpolysiloxane per alkenyl group in the organopolysiloxane (A). If the number of silicon atom-attached hydrogen atoms is less than 0.4, a cured composition fails to provide a necessary strength because of short curing. If the number of silicon atom-attached hydrogen atoms is more than 10, foaming will occur during curing and physical properties will change with time.

It is understood that any of well-known adhesion promoters such as organohydrogenpolysiloxanes having at least one SiH group and at least one epoxy functional group, ester functional group or alkoxy functional group in a molecule is added to the composition of the invention if desired. In this embodiment, the components are blended in such amounts that per alkenyl group in component (A), 0.4 to 10, preferably 1.2 to 5 SiH groups are available from the organohydrogenpolysiloxane as component (B) and the other organohydrogenpolysiloxane outside component (B) combined.

Component (C) is a platinum catalyst for promoting addition curing reaction or hydrosilation between the alkenyl-bearing organopolysiloxane and the organohydrogenpolysiloxane. The platinum catalyst is platinum or a platinum compound and selected from well-known ones. Examples include platinum black, chloroplatinic acid, alcohol-modified chloroplatinic acid, and complexes of chloroplatinic acid with olefins, aldehydes, vinylsiloxanes, and acetylene alcohol.

When the application of the composition according to the invention is taken into account, the introduction of corrosive components is undesired. In this sense, the platinum catalyst is desirably chloride ion free. Accordingly, the preferred platinum catalysts are zero-valent platinum complexes having a chloride ion content of less than 5 ppm, for example, vinylsiloxane/platinum complexes as described in U.S. Pat. No. 3,715,334, 3,775,452, and 3,814,730.

The platinum catalyst is added in a catalytic amount. The amount of the platinum catalyst added may be properly determined in accordance with the desired cure rate although it is preferably 0.1 to 2,000 ppm, especially 1 to 200 ppm calculated as elemental platinum on a weight basis per the total weight of the composition, especially the total weight of components (A) and (B).

Component (D) is a (meth)acryloxyalkyl-modified organopolysiloxane which is the key compound to the present invention. The compound exerts enhanced adhesion due to the high affinity to substrates of the (meth)acryl groups in the compound.

The (meth)acryloxyalkyl-modified organopolysiloxanes (indicating a class of acryloxyalkyl-modified organopolysiloxanes and methacryloxyalkyl-modified organopolysiloxanes) used herein are those in which the siloxane ($\equiv$Si—O—Si$\equiv$) chain in the molecule has a linear or cyclic structure. Upon heat curing, the (meth)acryloxyalkyl-modified organopolysiloxane diffuses through the composition and migrates toward the interface with the substrate. In view of this mechanism, the organopolysiloxanes whose siloxane chain is linear or cyclic can readily diffuse through the composition and thus exert its effect whereas the siloxane chain having a branched structure rather obstructs diffusion of molecules, failing to achieve the effect of the invention. In the case of linear organopolysiloxanes, their molecular chain end is terminated with a silanol group (or a hydroxyl group attached to a silicon atom) or blocked with a triorganosiloxy group such as trimethylsiloxy.

It is desired for the (meth)acryloxyalkyl-modified organopolysiloxane (D) that its organopolysiloxane molecule is free of a hydrogen atom attached to a silicon atom (that is, SiH group). If a (meth)acryloxyalkyl-modified organopolysiloxane having SiH groups is used as component (D), addition reaction can proceed between molecules of component (D) whereby the (meth)acryloxyalkyl-modified organopolysiloxane separates from the organopolysiloxanes as components (A) and (B), probably resulting in unstable adhesion-promoting effect or even poor adhesion.

Preferably, the (meth)acryloxyalkyl-modified organopolysiloxane (D) is represented by the following general compositional formula (3):

 (3)

wherein $R^4$ is hydrogen, hydroxyl, $C_{1-10}$ alkyl or aryl; $R^5$ is a (meth)acryloxyalkyl group represented by the formula:

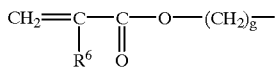

$R^6$ is hydrogen or methyl; g is an integer of 2 to 6, preferably equal to 2, 3 or 4; e is a positive number of 0.8 to 2.4, preferably 1 to 1.8; f is a positive number of 0.1 to 1.2, preferably 0.2 to 1, more preferably 0.4 to 1; e+f is a positive number of 2 to 2.5, preferably 2 to 2.2.

The alkyl and aryl groups represented by $R^4$ are as defined above for $R^1$, preferably methyl, ethyl, propyl and phenyl, with methyl being especially preferred.

Since the (meth)acryloxyalkyl-modified organopolysiloxane (D) tends to promote adhesion more as its affinity increases, it is preferred that the concentration of (meth)acryl groups in the organopolysiloxane be higher. Illustratively, the (meth)acryloxyalkyl-modified organopolysiloxane preferably has a (meth)acryl equivalent of 140 to 500, especially 170 to 340. A (meth)acryl equivalent of more than 500 would lead to poor adhesion whereas a modified organopolysiloxane having a (meth)acryl equivalent of less than 140 would be unstable or difficult to synthesize.

The (meth)acryloxyalkyl-modified organopolysiloxane (D) should have a viscosity at 25° C. of 5 to 10,000 centipoise (cp), preferably 5 to 5,000 cp, more preferably 10 to 1,000 cp. A viscosity of less than 5 cp indicates a greater solubility in the organosiloxanes as components (A) and (B) so that the (meth)acryloxyalkyl-modified organopolysiloxane (D) cannot remain at the interface with the substrate, resulting in poor adhesion. A viscosity in excess of 10,000 cp indicates a greater molecular weight so that the diffusion of (meth)acryloxyalkyl-modified organopolysiloxane (D) through the composition is slowed down.

From the standpoints of diffusion through the composition, affinity to the substrate, and stability of molecules, the linear or cyclic organopolysiloxane (D) should desirably have about 2 to about 40, more desirably about 3 to about 30, especially about 4 to about 20 silicon atoms per molecule (the number of silicon atoms corresponding to the degree of polymerization). For the same reason, the linear or cyclic organopolysiloxane (D) should desirably have at least 2, more desirably 3 to 20, especially 4 to 10 (meth)acryloxyalkyl groups per molecule.

The amount of (meth)acryloxyalkyl-modified organopolysiloxane (D) blended is 0.0001 to 3 parts, preferably 0.0005 to 1 part, more preferably 0.001 to 0.8 part by weight per 100 parts by weight of the organopolysiloxane (A). Less than 0.0001 part of component (D) is too small to promote adhesion. With more than 3 parts of component (D), the addition reaction between components (A) and (B) unbalances three-dimensional crosslinking reaction, failing to provide a satisfactory rubber hardness.

Where the cure time of the composition must be adjusted in order that the composition be practically applicable, conventional well-known inhibitors for addition curing compositions may be used. Such inhibitors include vinyl-bearing organopolysiloxanes such as vinylcyclotetrasiloxane, triallyl isocyanurate, alkyl maleates, acetylene alcohols and silane or siloxane modified products thereof, hydroperoxides, tetramethylethylenediamine, benzotriazole and mixtures thereof. These compounds may be used alone or in combination of two or more. The amount of the inhibitor added is determined such that the desired cure and shelf stability of the composition may not be adversely affected. other additives may be added to the composition of the invention insofar as they do not impair the effects of the invention. Such additives include reinforcing fillers such as silica (for example, fumed silica, precipitated silica and crushed silica), non-reinforcing fillers such as quartz flour, diatomaceous earth and calcium carbonate; coloring agents such as inorganic pigments (e.g., cobalt blue) and organic dyes; and heat resistance and flame retardance enhancers such as cerium oxide, zinc carbonate, manganese carbonate, red iron oxide, titanium oxide, and carbon black. Also optionally, whisker carbon black, structured carbon black, or graphite may be added to the composition for the purpose of improving electric conduction stability. These optional additives may be added in conventional amounts as long as the objects of the invention are not impaired.

The silicone composition of the addition curing type according to the invention is generally prepared by agitating and mixing the above-described essential and optional components in a conventional manner. Curing conditions include a temperature of 40 to 300° C. and a time of 0.1 to 10 hours.

There has been described a silicone composition of the addition curing type comprising (A) an organopolysiloxane, (B) an organohydrogenpolysiloxane, (C) a platinum catalyst, and (D) a (meth)acryloxyalkyl-modified organopolysiloxane as an adhesion promoter. The composition has improved curing stability, thermal stability and adhesion and cures into a product capable of firm adhesion to difficultly bondable resins such as polycarbonates and polyphenylene sulfites. The composition is applicable as the adhesive to electric and electronic parts and automotive parts.

EXAMPLE

Examples of the invention are given below by way of illustration and not by way of limitation. It is noted that the viscosity is a measurement at 25° C., Me is methyl, and Vi is vinyl.

Examples & Comparative Examples

Silicone compositions of the addition curing type were prepared in accordance with the formulation shown in Tables 1 and 2 wherein the amounts of respective components are expressed in parts by weight. They were measured for hardness and shear bond strength by the following methods. The results are also shown in Tables 1 and 2.

Hardness

Hardness was measured by A type hardness meter in accordance with JIS K-6301. An initial hardness was measured just after curing a composition at 120° C. for 60 minutes. A hardness after heating was measured after heating the cured product at 200° C. for 500 hours. A hardness after storage was measured after storing the uncured composition at 40° C. for 72 hours, and then curing the uncured composition at 120° C. for 60 minutes.

Shear bond strength

The substrates used were glass plates and polycarbonate (PC) plates of 25 mm wide. A pair of plates were joined with a cured silicone rubber over a bond area of 10 mm×25 mm (rubber thickness 2 mm). The plates were pulled in opposite directions (orthogonal to the rubber thickness) at a tension speed of 50 mm/min. The load applied until failure of the bond interface between the substrate and the cured silicone rubber was measured by means of an auto-graph. The tensile shear strength was calculated as the load per unit area.

TABLE 1

| Components (pbw) | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| V-Sx | | 100 | 100 | 100 | 100 | 100 | 100 | 100 | 100 | 100 | 100 | 100 | 100 |
| Fumed silica | | 10 | 10 | 10 | 10 | 10 | 10 | 10 | 10 | 10 | 10 | 10 | 10 |
| Platinum catalyst | | 0.1 | 0.1 | 0.1 | 0.1 | 0.1 | 0.1 | 0.1 | 0.1 | 0.1 | 0.1 | 0.1 | 0.1 |
| Inhibitor | | 0.1 | 0.1 | 0.1 | 0.1 | 0.1 | 0.1 | 0.1 | 0.1 | 0.1 | 0.1 | — | — |
| H-Sx | | 2.5 | 2.5 | 2.5 | 2.5 | 2.5 | 2.5 | 2.5 | 2.5 | 1.5 | 1.5 | 2.5 | 2.5 |
| Add-1 | | 0.5 | 0.1 | 0.01 | 0.001 | — | — | — | — | — | — | — | — |
| Add-2 | | — | — | — | — | 0.5 | 0.1 | — | — | — | — | — | — |
| Add-3 | | — | — | — | — | — | — | 0.5 | 0.1 | — | — | — | — |
| Add-4 | | — | — | — | — | — | — | — | — | 0.5 | 0.1 | — | — |
| Add-10 | | — | — | — | — | — | — | — | — | — | — | 0.5 | 0.1 |
| Hardness (JIS A) | Initial | 25 | 24 | 26 | 24 | 28 | 27 | 26 | 25 | 27 | 27 | 26 | 24 |
| | After heating | 31 | 28 | 30 | 31 | 34 | 32 | 30 | 31 | 35 | 34 | 32 | 30 |
| | After storage | 24 | 25 | 26 | 25 | 28 | 28 | 27 | 28 | 26 | 24 | 24 | 24 |
| Shear bond strength (kgf/cm$^2$) | Glass | 18 | 16 | 18 | 19 | 16 | 18 | 15 | 17 | 18 | 18 | 15 | 12 |
| | PC | 16 | 15 | 18 | 16 | 15 | 16 | 13 | 16 | 16 | 17 | 13 | 11 |

TABLE 2

| Components (pbw) | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| V-Sx | | 100 | 100 | 100 | 100 | 100 | 100 | 100 | 100 | 100 | 100 |
| Fumed silica | | 10 | 10 | 10 | 10 | 10 | 10 | 10 | 10 | 10 | 10 |
| Platinum catalyst | | 0.1 | 0.1 | 0.1 | 0.1 | 0.1 | 0.1 | 0.1 | 0.1 | 0.1 | 0.1 |
| Inhibitor | | 0.1 | 0.1 | 0.1 | 0.1 | 0.1 | 0.1 | 0.1 | 0.1 | — | — |
| H-Sx | | 1.5 | 1.8 | 2.6 | 1.5 | 1.8 | 1.8 | 1.5 | 1.5 | 2.5 | 2.5 |
| Add-5 | | 0.5 | — | — | — | — | — | — | — | — | — |
| Add-6 | | — | 0.5 | — | — | 0.5 | 0.5 | — | — | — | — |
| Add-7 | | — | — | 0.5 | — | — | — | — | — | — | — |
| Add-8 | | — | — | — | 0.5 | — | — | 0.5 | 0.5 | — | — |
| Add-9 | | — | — | — | — | — | — | — | — | 0.5 | 0.1 |
| TPT | | — | — | — | — | — | 0.1 | — | 0.1 | — | — |
| Al chelate | | — | — | — | — | — | — | 0.1 | — | 0.1 | — |
| Hardness (JIS A) | Initial | 29 | 26 | 23 | 28 | 24 | 23 | 28 | 26 | 27 | 25 |
| | After heating | 34 | 31 | 34 | 37 | 26 | 14 | 34 | 12 | 33 | 31 |
| | After storage | 37 | 35 | 10 | 25 | 12 | 24 | 11 | 25 | 27 | 26 |
| Shear bond strength (kgf/cm²) | Glass | 8 | 17 | 18 | 9 | 18 | 17 | 16 | 17 | 10 | 8 |
| | PC | 1 | 2 | 15 | 1 | 10 | 11 | 5 | 8 | 4 | 3 |

V-Sx: vinyl-bearing dimethylpolysiloxane

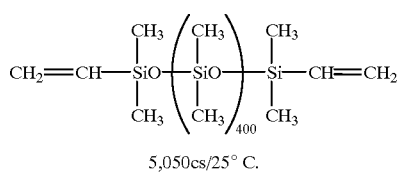

5,050cs/25° C.

H-Sx: methylhydrogenpolysiloxane

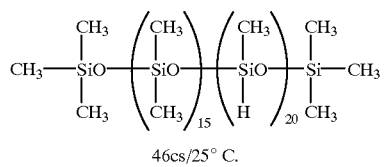

46cs/25° C.

Platinum catalyst:
  platinum complex of 1,2-divinyl-1,1,2,2-tetramethyldisiloxane/toluene solution (Pt concentration 0.5 wt %)
Inhibitor: 1-ethynyl-cyclohexanol/toluene solution (50 wt %)
Fumed silica: specific surface area 300 m²/g (BET adsorption method)
Adhesion promoter:

Add-1 (80 cp, acryl equivalent 172)

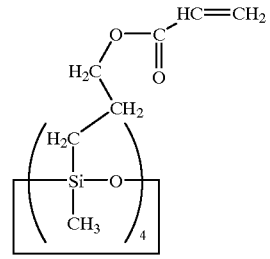

-continued

Add-2 (150 cp, acryl equivalent 325)

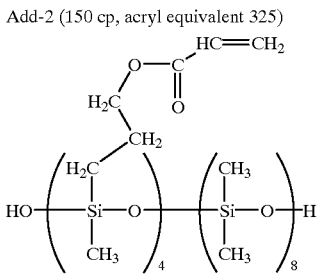

Add-3 (330 cp, acryl equivalent 473)

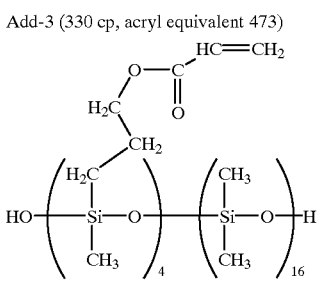

Add-4 (120 cp, acryl equivalent 287)

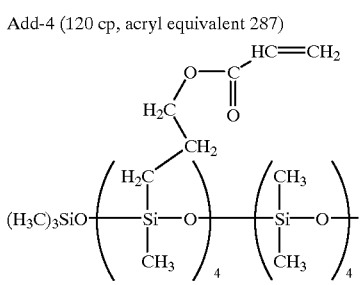

Add-5 (5 cp)

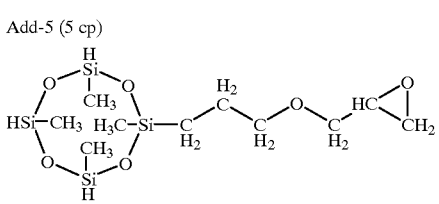

-continued

Add-6 (30 cp)

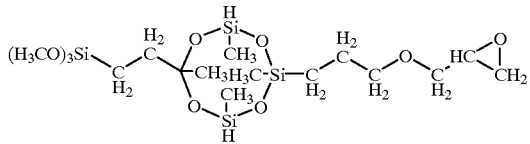

Add-7 (500 cp)

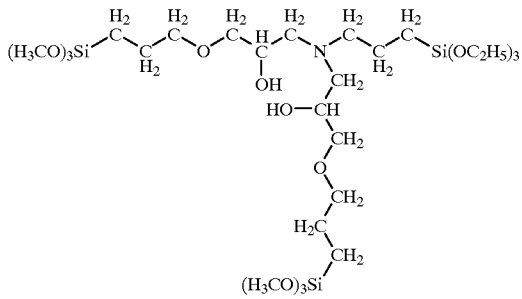

Add-8 (50 cp)

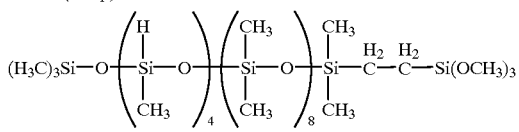

Add-9: branched acryloxyalkyl-modified organopoly-
siloxane (180 cp, acryl equivalent 276)

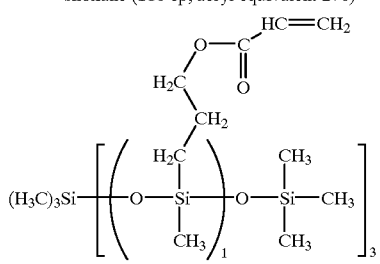

Add-10: methacryloxyalkyl-modidfied organopolysiloxane
(150 cp, acryl equivalent 339)

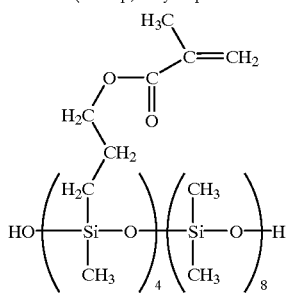

TPT: Ti(O—C(CH$_3$)$_2$)$_4$
Al chelate:

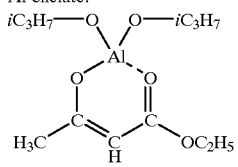

Japanese Patent Application No. 038189/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An addition curing type silicone composition comprising (A) 100 parts by weight of an organopolysiloxane having at least two alkenyl groups each attached to a silicon atom in a molecule, represented by the following average compositional formula (1):

$$R^1_a R^2_b SiO_{(4-a-b)/2} \quad (1)$$

wherein $R^1$ is a substituted or unsubstituted monovalent hydrocarbon group free of an aliphatic unsaturated bond, $R^2$ is an alkenyl group, letter a is a number of 1.4 to 2.0, b is a number of 0.0001 to 0.5, and the sum of a and b is from 1.9 to 2.05, (B) an organohydrogenpolysiloxane having at least two hydrogen atoms each attached to a silicon atom in a molecule, represented by the following average compositional formula (2):

$$R^3_c H_d SiO_{(4-c-d)/2} \quad (2)$$

wherein $R^3$ is a substituted or unsubstituted monovalent hydrocarbon group free of an aliphatic unsaturated bond, letter c is a number of 0.7 to 2.0, d is a number of 0.005 to 1.2, and the sum of c and d is from 0.8 to 3.0, in an amount to provide 0.4 to 10 silicon atom-attached hydrogen atoms per alkenyl group in the composition, (C) a catalytic amount of a platinum catalyst, (D) 0.0001 to 3 parts by weight of a (meth)acryloxyalkyl-modified organopolysiloxane having a cyclic organopolysiloxane structure or having linear organopolysiloxane structure in which the molecular chain end is terminated with a silanol group or blocked with a triorganosiloxy group, said (meth)acryloxyalkyl-modified organopolysiloxane having a viscosity of 5 to 10,000 centipoise at 25° C.

2. The composition of claim 1, wherein said (meth)acryloxyalkyl-modified organopolysiloxane (D) has an acryl equivalent of 140 to 500.

3. The composition of claim 1, wherein said (meth)acryloxyalkyl-modified organopolysiloxane (D) is free of a hydrogen atom directly attached to a silicon atom.

4. The composition of claim 1, wherein said (meth)acryloxyalkyl-modified organopolysiloxane (D) is represented by the following average compositional formula (3):

$$R^4_e R^5_f SiO_{(4-e-f)/2} \quad (3)$$

wherein $R^4$ is hydrogen, hydroxyl, C1-10 alkyl or aryl, $R^5$ is a (meth)acryloxylakyl group represented by the formula: $CH_2=C(R^6)C(O)O(CH_2)_g-$ in which $R^6$ is hydrogen or methyl and g is an integer of 2 to 6, e is a positive number of 0.8 to 2.4, f is a positive number of 0.1 to 1.2, and e+f is a positive number of 2 to 2.5.

5. The composition of claim 1, wherein said catalyst (C) is a zero-valent platinum complex having a chloride ion content of less that 5 ppm.

6. The composition of claim 1, wherein said organohydrogenpolysiloxane (B) has a degree of polymerization of about 3 to about 200.

7. The composition of claim 1, wherein $R^1$ is methyl and $R^2$ is vinyl.

* * * * *